Aug. 1, 1961  J. J. RODDY  2,994,540
CHUCK
Filed Aug. 30, 1960  2 Sheets-Sheet 1

INVENTOR.
JOHN J. RODDY
BY
Lindsey, Preutzman and Hayes
ATTORNEYS

Aug. 1, 1961  J. J. RODDY  2,994,540
CHUCK

Filed Aug. 30, 1960  2 Sheets-Sheet 2

INVENTOR.
JOHN J. RODDY
BY
Lindsey, Brutzman and Hayes
ATTORNEYS

United States Patent Office 2,994,540
Patented Aug. 1, 1961

2,994,540
CHUCK

John J. Roddy, Meriden, Conn., assignor to The Skinner Chuck Company, New Britain, Conn., a corporation of Connecticut
Filed Aug. 30, 1960, Ser. No. 52,797
5 Claims. (Cl. 279—110)

This invention relates generally to chucking devices and is more particularly concerned with the provision of an improved jaw operating mechanism for chucks and the like.

An object of the invention is to provide a chuck with an improved jaw operating mechanism which prevents application of excessive jaw forces.

It is an object of the invention to provide such a chuck which will permit a powerful gripping of a work piece and which will restrain the driving means closing the chuck jaws upon the application of excessive jaw forces.

It is another object of the invention to provide an improved jaw operating mechanism for chucks and the like which fails-safe upon the application of jaw forces greater than a predetermined limit so as to lock the mechanism against further jaw movement.

Another object of the invention is to provide a reliable and readily reset fail-safe, force limiting jaw operating mechanism for chucks and the like.

Other objects will be in part obvious and in part pointed out more in detail hereinafter.

The invention accordingly consists in the features of construction, combination of elements and arrangement of parts which will be exemplified in the construction hereafter set forth and the scope of the invention which will be indicated in the appended claims.

The chuck 5 of the figures is of the pinion operated type and utilizes the mechanical principles and the basic structures and parts of the chuck described in the co-pending application of Harold L. Arnold, Serial No. 739,035, filed June 2, 1958. Although this type of chuck is perhaps best illustrative of one in which the present invention is preferably embodied, it will be appreciated that the invention may be used in other chucks within the spirit and scope of the invention.

Figure 1:
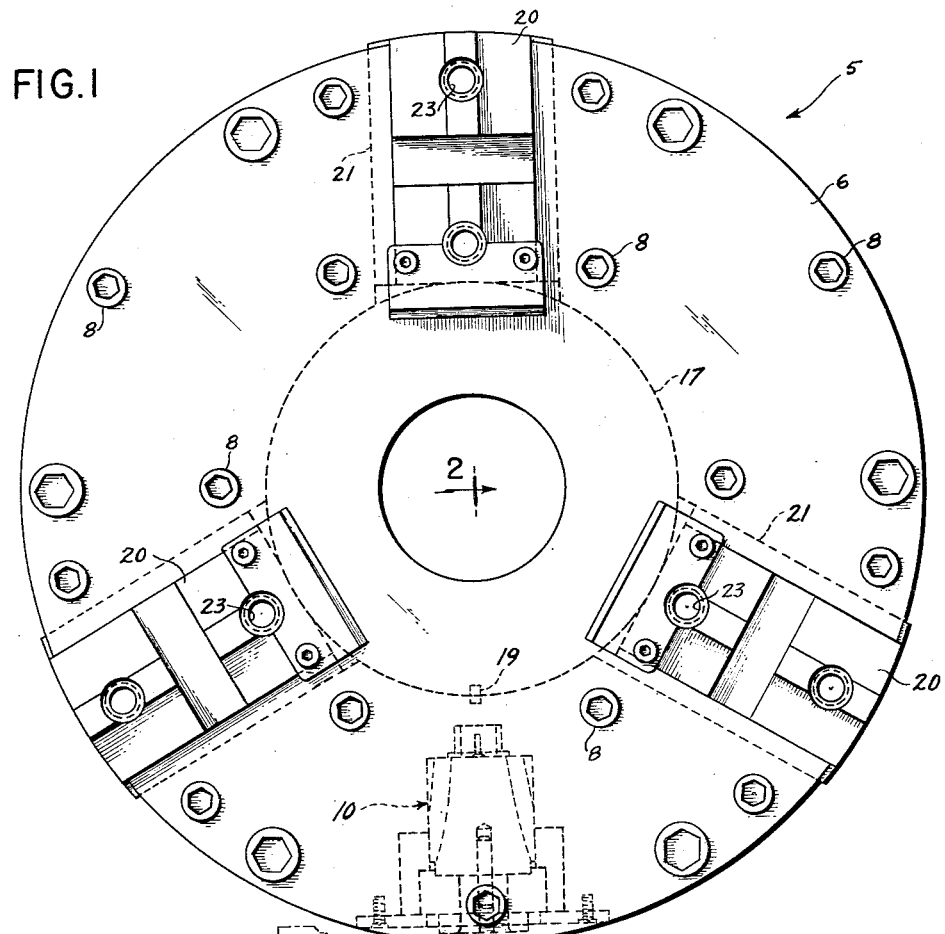
FIG. 1 is a view in front elevation of a chuck embodying the invention.
Figure 2:
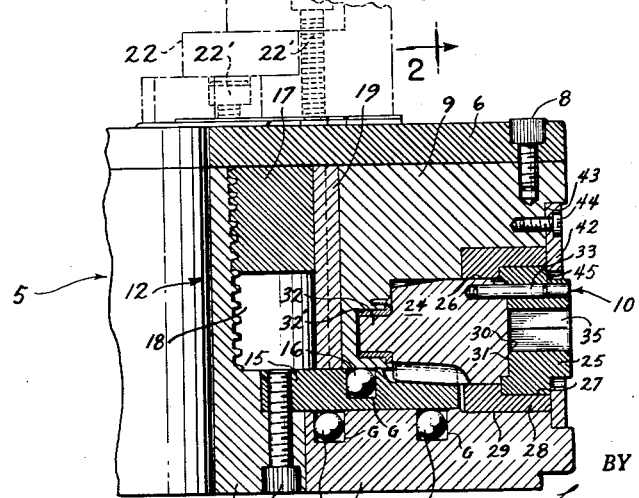
FIG. 2 is a sectional view taken along the line 2—2 of FIG. 1.

Referring to FIGS. 1 and 2 herein, the chuck 5 comprises circumferentially co-extending, annular face and backing plates 6 and 7, respectively, axially spaced by an annular body portion 9 to which they are secured by bolts 8. A center sleeve 12, threaded at its outer surface adjacent its front end, provides a rear hub portion 13 where it is secured by bolts 14 to a ring gear 15. The ring gear 15 is rotatably mounted between the annular body portion 9 and the backing plate 7 on roller bearings 16 which are disposed in radially spaced, circumferentially extending grooves G in the backing plate adjacent the rear surface of the ring gear 15, and in the ring gear 15 adjacent the rear surface of the annular body portion 9.

The rotary movement of the ring gear 15 and the sleeve 12, secured thereto, drives the jaw actuator nut 17 which threadedly engages the front end of the sleeve 12. The actuator nut 17 is keyed against rotary movement at its outer surface, as at 19, to the body portion 9 so that when the ring gear 15 is rotated, the nut 17 moves axially in the annular chamber 18 defined by the sleeve 12, body portion 9, face plate 6 and ring gear 15. In turn, the actuator nut 17 will impart radial movement to the chuck jaw carriers 20 which ride in the radially disposed guideways 21. The nut 17 and jaw carriers 20 are tongue and groove connected in rearwardly diverging planes to accommodate this action as detailed in the co-pending application Serial No. 739,035, already noted. The work piece engaging jaws 22 (only one of which is partially shown in phantom in FIG. 2) are mounted on the carriers 20 and are retained there by locking screws 22' engaged within the threaded holes 23 (FIG. 1) of the jaw carriers 20.

Figure 3:
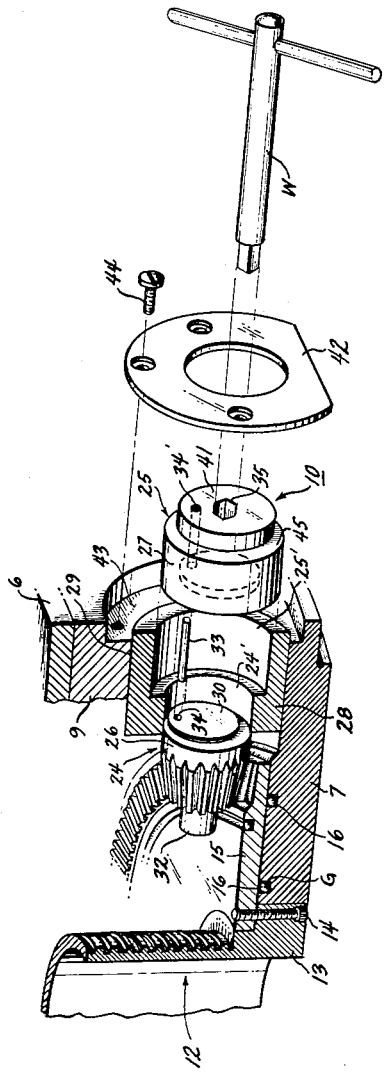
FIG. 3 is a fragmentary perspective view of the chuck and showing the fail-safe portions of the jaw operating mechanism and retainer bushing therefor outwardly exploded.

The ring gear 15 is driven by a radially disposed pinion mechanism generally designated at 10. As best seen in FIGS. 2 and 3, the pinion mechanism 10 in the embodiment shown comprises an inner pinion gear member 24, which meshes with the ring gear 15, and an outer pinion driver member 25. The members 24, 25 are arranged in end to end and preferably abutting relationship with their respective opposing ends providing a circular hub portion 30 nested within a complementary recess 31. The gear 24 and driver 25 are coaxially disposed in a bushing 28 in which they are loosely journalled and which in turn is secured in a radially extending access opening 29 in the chuck body portion 9.

As best seen in FIG. 3, in which the pinion driver 25 and bushing 28 are exploded outwardly relative to the chuck body, the gear 24 and driver 25 provide concentric outer surfaces of revolution 26 and 27, respectively, with the surface of revolution 27 of the pinion driver 25 being dimensionally larger than the surface of revolution 26 of the pinion gear 24. The bushing 28 appropriately provides radially and axially spaced inner wall surfaces 24', 25' to accommodate the varying diameters of the gear 24 and driver 25, respectively.

As best seen in FIG. 2, the pinion means 10 is restrained against inward movement relative to the chuck body and supported for rotation by the inwardly projecting retainer shank 32 at its inner end mating with a complementary bore 32' in the chuck body portion 9. Outward movement of the pinion means 10 is precluded by a retainer plate 42, apertured to receive the outer head portion 41 of the pinion driver 25, and secured at its outer edges to a recessed ledge 43 in the chuck body portion 9 by bolts 44. This plate 42 also overlies the outer edge of the bushing 28 to restrain it in its secured position within the body portion 9.

Figure 4:
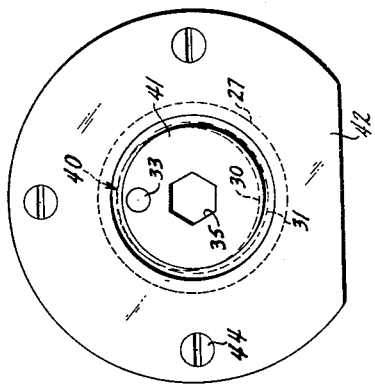
FIG. 4 is an end view of the fail-safe mechanism.

As best seen in FIGS. 3 and 4, the nesting hub 30 and recess 31 of the pinion gear 24 and driver 25 extend circumaxially relative to the axis of the pinion means 10 and are disposed eccentrically to one another and to the outer surfaces of revolution 26 and 27 of the pinion gear 24 and driver 25. With particular reference to FIG. 4, it is seen that the circumferentially opposing surfaces of the hub 30 and recess 31 are normally positioned so as to touch on the high side of their eccentricity as indicated at 40.

Rotary movement of the pinion means 10 about its axis is instigated by driving means such as a wrench W which is received in the socket 35 provided in the outer end of the pinion driver 25. In order to transfer the rotary movement from the wrench and pinion driver 25 to the pinion gear 24, a shear pin 33 extends within the axially disposed and aligned pin retainer openings 34, 34' in the opposing ends of the pinion elements 24 and 25. The shear pin 33 is radially spaced from the axis of rotation of the pinion means 10 to lie adjacent the outermost edges of the nesting hub 30, recess 31 and outer head portion 41 of the driver 25 in order to obtain efficient leverage for the transfer of rotary forces and may be selected from pins of varying shear strength characteristics for varying the predetermined force to be transferred to the jaws 2.

The nesting hub 30 and recess 31 constitute opposing, radially spaced and axially extending cam surfaces. When the shear pin 33 fails in response to excessive forces between the work piece (not shown) and the jaw elements 20, 22, the cam surfaces are so disposed as to cam the pinion gear 24 and driver 25 in opposite radial directions to wedge the two pinion members against the inner surfaces 24', 25' of the bushing 28. In the preferred embodiment shown, the hub 30 and recess 31 comprise circumaxial and curvilinear cam surfaces formed integrally in the pinion means 10.

In operation, the wrench W is inserted in the wrench socket 31 of the pinion driver 25. The driver 25 and gear 24 are driven by the wrench through the shear pin 33. The ring gear 15, actuator nut 17, and jaw elements 20 are thereby motivated. When the wrench W is resisted sufficiently by the load on jaw elements 20, 22, and consequently on the sleeve 12, ring gear 15 and pinion means 10, the shear pin 33 will fail thereby disengaging the pinion gear 24 and driver 25. The driver 25 will then rotate relative to the gear 24 until the opposed surfaces of revolution of the hub 30 and recess 31 cam the gear 24 and driver 25 in opposite radial directions to wedge the two pinion elements against the walls 24', 25' of the bushing 28.

In the embodiment shown, the radial camming action between the opposing curvilinear surfaces of the hub 30 and recess 31 will be immediate upon failure of the pin 33 because of their eccentric disposition relative to one another with the high points 40 of their eccentricity in contact.

The pinion mechanism 10 may be reset by removing the pinion gear 24 and driver 25 from the bushing 28 and replacing the shear pin 33.

The invention, therefore, provides a chuck of the type having jaw elements which grip a work piece, or the like, with substantial jaw forces and will automatically restrain the driving means closing the chuck jaws upon the application of excessive jaw forces. The chuck of the invention provides a fail-safe jaw operating mechanism comprising cooperable parts which wedge lock against further operation in response to excessive jaw forces applied to the work piece. When a power wrench is used to close the chuck jaws, the fail-safe feature in the chuck of the invention will help to protect the work piece as well as the parts of the chuck, and when a hand wrench is used, the operator of the chuck will be protected against loss of equilibrium due to a sudden absence of wrench torque resistance when closing the chuck jaws.

The elements shown and described herein may be readily modified by those skilled in the art without departing from the spirit and scope of the invention which are defined by the following claims.

I claim:

1. In a chuck providing a plurality of jaw elements mounted for opening and closing action relative to one another and adapted for gripping a work piece or the like therebetween; jaw operating means connecting said jaw elements for driving the same and comprising, a pair of members mounted in the chuck for rotary movement about a common axis, means connecting said members to transfer rotary forces therebetween and adapted to permit said members to rotate relative to one another in response to gripping forces exerted by said jaw elements, said members providing opposing axially extending cam surfaces spaced radially from the axis of said members and disposed to cam said members in substantially opposite radial directions to wedge the same within the chuck when said members rotate relative to one another.

2. In a chuck providing a plurality of jaw elements mounted for opening and closing action relative to one another and adapted for gripping a work piece or the like therebetween; jaw operating means connecting said jaw elements for driving the same and including a pair of members mounted in the chuck for rotary movement about a common axis, means connecting said members to transfer rotary forces therebetween and adapted to permit said members to rotate relative to one another in response to gripping forces exerted by said jaw elements, said members providing radially opposing and axially extending curvilinear cam surfaces spaced radially from the axis of said members, said cam surfaces being disposed to cam said members in substantially opposite radial directions to wedge the same within said chuck when said members rotate relative to one another.

3. In a chuck providing a plurality of jaw elements mounted for opening and closing action relative to one another and adapted for gripping a work piece or the like therebetween; jaw operating means connecting said jaw elements for driving the same and comprising, a pair of members mounted in the chuck for rotary movement about a common axis, means connecting said members to transfer rotary forces therebetween and adapted to permit said members to rotate relative to one another in response to gripping forces exerted by the jaw elements, said members providing radially opposing curvilinear cam surfaces extending circumaxially and eccentrically relative to the axis of said members and disposed to cam said members in substantially opposite radial directions to wedge the same within the chuck when said members rotate relative to one another.

4. In a chuck providing a plurality of jaw elements mounted for opening and closing action relative to one another and adapted for gripping a work piece or the like therebetween; jaw operating means connecting said jaw elements for driving the same and comprising, a pair of members mounted in the chuck for rotary movement about a common axis, means connecting said members to transfer rotary forces therebetween and adapted to permit said members to rotate relative to one another in response to gripping forces exerted by said jaw elements, the opposing ends of said members providing circular hub means and circular recess means for receiving said hub means, said hub means and said recess means providing axially extending and opposing curvilinear cam surfaces, said cam surfaces being eccentric relative to one another with their opposing surfaces adjacent the high point of their eccentricity in contact, said hub means and recess means extending circumaxially and eccentrically relative to the axis of said members, whereby said cam surfaces cam said members in substantially opposite radial directions to wedge the same within said chuck when said members rotate relative to one another.

5. A chuck for gripping a work piece or the like said chuck comprising, a plurality of circumferentially spaced and radially disposed jaw elements, means mounting said jaw elements for radial movement to close the same upon the work piece, operating means connecting said jaw elements for driving the same and including rotary gear means, pinion means, said pinion means including an inner pinion gear in mesh with said rotary gear means, an outer pinion driver, said pinion gear and said pinion gear driver having outer surfaces of revolution, bushing means secured in said chuck and loosely journalling said pinion gear and driver at said outer surfaces of revolution for rotational movement thereof about a common axis, said pinion gear and driver providing circular hub and recess means adjacent their opposing ends, said circular hub and recess means extending circumaxially relative to the axis of said pinion gear and driver and being eccentrically disposed relative thereto, said hub being nested within said recess, said circular hub and said recess being eccentric relative to one another with their surfaces adjacent the high point of their eccentricity in contact, and a shear pin axially disposed and radially spaced from the axis of said pinion means and interconnecting the same.

References Cited in the file of this patent

UNITED STATES PATENTS

| | | |
|---|---|---|
| 2,384,188 | Mercier | Sept. 4, 1945 |
| 2,822,181 | Sloan | Feb. 4, 1958 |